United States Patent [19]
Bland et al.

[11] 3,739,580
[45] June 19, 1973

[54] PROPULSION SYSTEM CONTROL

[75] Inventors: Aubrey M. Bland, St. Louis; Vincent H. Zimmermann, Olivette, both of Mo.

[73] Assignee: McDonnell Douglas Corporation, St. Louis, Mo.

[22] Filed: Mar. 10, 1971

[21] Appl. No.: 122,698

[52] U.S. Cl. .............. 60/204, 60/39.15, 60/224, 60/244, 244/12 B, 244/23 B
[51] Int. Cl. .................................. B61c 29/04
[58] Field of Search .............. 60/224, 226, 39.15, 60/204; 244/12 B, 23 B

[56] References Cited
UNITED STATES PATENTS

| | | | |
|---|---|---|---|
| 3,618,875 | 11/1971 | Kappus | 244/23 B |
| 3,388,878 | 6/1968 | Peterson et al. | 60/224 |
| 3,146,590 | 9/1964 | Erwin | 244/12 B |
| 3,154,917 | 11/1964 | Williamson | 244/23 B |

Primary Examiner—Clarence R. Gordon
Assistant Examiner—Robert E. Garrett
Attorney—Gravely, Lieder & Woodruff

[57] ABSTRACT

A propulsion and control system that includes gas generator means which discharges high energy gases into ducting which is connected to at least two thrust units for converting the high energy gases into propulsive thrusts. A separate pressure controller is associated with each thrust unit for restricting the flow of high energy gases to the thrust unit and thereby increasing back pressure in the ducting upstream from the pressure controllers and at the discharge end of the gas generator means. The two pressure controllers are operable independently of each other and the operation of either one increases the back pressure. Contemporaneously, with the increase in back pressure the gas generator means automatically discharges gases at an even higher energy level and as a result the thrust unit downstream from the pressure controller which is not operated delivers greater thrust, while the thrust unit downstream from the operated pressure controller delivers about the same amount of thrust.

11 Claims, 10 Drawing Figures

PROPULSION SYSTEM CONTROL

BACKGROUND OF THE INVENTION

This invention relates in general to propulsion systems and more particularly to a propulsion control system and method of producing a differential thrust, power, or energy level.

Need currently exists for an aircraft transport capable of flying at the speed of conventional fixed wing transports and having the further capability of taking off in a substantially vertical ascent and landing in a substantially vertical descent. Such an aircraft could provide regular airline service to many landing fields and areas which are now serviced only by helicopters and small fixed wing aircraft. While a few so-called VTOL (vertical take off and landing) aircraft have been designed, produced, and actually flown, the current VTOL designs have not been entirely successful, and furthermore not one is apparently suitable for use on aircraft transports. The primary problem with current VTOL designs and aircraft is one of flight control and weight.

In most VTOL aircraft of current design, turbine engines of one type or another are employed to provide power for or sufficient thrust in a vertical direction to lift the aircraft and to further control it in its ascent. This control is normally derived by oversizing the lift engines to provide significant thrust over and above the thrust necessary to lift the aircraft. Stated differently, when the lift engines, acting in concert, produce enough thrust in a vertical direction to enable the aircraft to rise in a stable ascent, the moments produced about the aircraft center of gravity will be equal and, if corresponding engines are spaced equidistant from the center of gravity, all will exert the same thrust. However, should the pilot desire to maneuver the aircraft so as to purposely create a roll, one engine will have to exert a greater thrust than the opposite and corresponding engine to create a condition of moment unbalance. Likewise, should one of the moments be disturbed in a normal ascent or descent, then at least one of the engines will have to exert an even greater thrust to not only overcome the moment exerted by the opposite corresponding engine, but to also bring the aircraft back into a stabilized disposition during the ascent or descent. For example, if the aircraft has a lift engine or system in each wing and if, while both are producing sufficient thrust to lift the plane, the plane as the result of an air disturbance tends to rotate about its longitudinal axis, thereby dipping one wing and raising the other, the engine in the dipped wing must produce even greater thrust to right the aircraft. The greater or maximum thrust level required for control must be reserved for control and cannot be used for lift. Consequently, all lift engines are oversized considerably in order to afford adequate control of the aircraft.

Many VTOL concepts utilize wing tip thrusters and fore and aft fuselage thrusters for lift, and these thrusters are connected with engines which are bled for purposes of control, that is to provide differential thrust. Of course, when such bleeding is employed a lift penalty exists, and this penalty requires oversizing the engines as previously discussed.

Oversizing the engines is also necessary to compensate for engine failure, and normally the oversizing must be enough to maintain the aircraft airborne with more than one engine inoperative, the reason being that when one engine fails its opposite and corresponding engine must be throttled or shut down to avoid an extreme moment unbalance.

OBJECTS OF THE INVENTION

One of the principal objects of the present invention is to provide a propulsion system and method of propulsion for a fixed wing aircraft which enables the aircraft to take off in a substantially vertical ascent and land in a substantially vertical descent. Another object is to provide a propulsion control system and method of propulsion modulation for aircraft which avoids penalizing either the aircraft or its propulsion system in order to provide high quality control. A further object is to provide a propulsion system having multiple propulsion units which are easily modulated to provide control and do not require reserve power for this control. A still further object is to provide a propulsion control system which is simple in construction and extremely reliable. An additional object is to provide a propulsion control system which is extremely light in weight. Still another object is to provide a propulsion system which affords large and fast differential thrust modulation without detracting from the overall lift and without oversizing the propulsion system. Yet another object is to provide a control system which produces a high degree of control without overstressing the engines of the system. These and other objects and advantages will become apparent hereinafter.

The present invention is embodied in a propulsion system having gas generating means and thrust units located downstream from the gas generating means. Pressure control means are provided for throttling the gas flow to the thrust units. The invention also consists in the parts and in the arrangements and combinations of parts hereinafter described and claimed.

DESCRIPTION OF THE DRAWINGS

In the accompanying drawings which form part of the specification and wherein like numerals refer to like parts wherever they occur.

PROPULSION DESCRIPTION

Referring now in detail to the drawings, 2 designates an aircraft (FIG. 1) having a fuselage 4, a tail assembly 5, and wings 6 and 8. The aircraft 2 may be of the transport variety on any other type.

Figure 1:
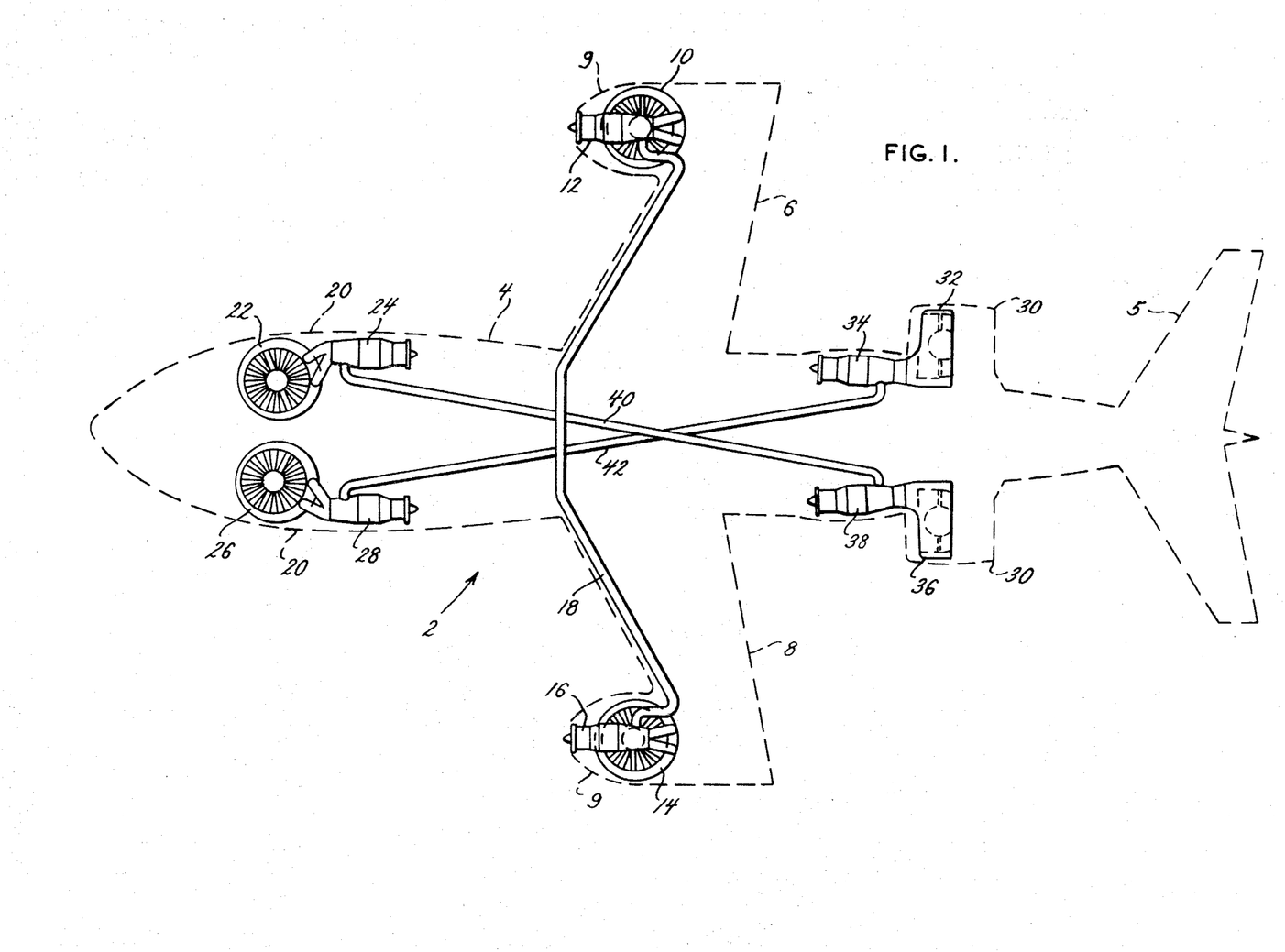
FIG. 1 is a plan view of a typical aircraft configuration provided with a propulsion control system constructed in accordance with and embodying the present invention, the aircraft being shown in phantom and the propulsions system in full lines.

Mounted at the outer ends of the wings 6 and 8 are nacelles 9. The right nacelle 9 houses a lift fan 10 which as the name implies is oriented such that it exerts an upwardly directed reactive force on the aircraft 2 due to the downwardly directed flow of the primary gas therefrom. The lift fan 10 is powered by a turbine engine 12 which is also located in the nacelle 9, and more particularly it is powered by the high energy gases discharged from the engine 12. In other words, the engine 12 constitutes a gas generator which discharges gases at elevated temperature and pressure and likewise at relatively high velocity. The fan 10 constitutes a thrust unit which extracts energy from these gases and the energy so extracted powers the fan 10, creating an augmented lift reaction at the outer end of the wing 6. Likewise, the nacelle 9 of the left wing 8 contains a fan 14 and turbine engine 16, and the latter powers the former so as to create an upwardly directed reactive force at the outer end of the left wing 8.

The portion of the ducting between the engine 16 and the fan 14, that is the portion through which the hot and pressurized gases flow toward the fan 14 is connected to a transverse connecting duct 18 (FIG. 1) which extends through the wings 6 and 8, and fuselage 4 and at its opposite end is connected with the corresponding portion of the turbine engine 12.

The forward cabin of the fuselage 4 is configured at 20 (FIG. 1) to receive a pair of lift fans 22 and 26 which are powered by turbine engines 24 and 28, respectively (FIG. 1). Both the fans 22 and 26 are oriented in a vertical direction and discharge air downwardly so as to create an upwardly directed reactive force on the nose portion of the fuselage 4.

Finally, to the rear of the wings 6 and 8 and slightly forwardly from the tail assembly 5, the fuselage 4 carries two nacelles 30 (FIG. 1). The right nacelle 30 houses a thrust fan 32 and a turbine engine 34. The gases discharged from the engine 34 power the fan 32, and that fan is oriented such that it normally discharges the air rearwardly, thus creating a forwardly directed force for propelling the aircraft through the air in forward flight. The fan 32, however, is provided with a vectoring system (not shown) which may be moved to a position for diverting the thrust from the fan 32 downwardly. The fans 26 and 32 and their respective turbine engines 28 and 34 are sized such that they can and normally do produce equal and opposite moments about the center of gravity for the aircraft.

The other nacelle 30, that is the one on the left side of the fuselage, houses a fan 36 (FIG. 1) and a turbine engine 38, which powers the fan 36. Like the fan 32, the fan 36 is provided with a vectoring system for diverting the airstream downwardly so that it may produce lift instead of longitudinal thrust for VTOL flight. When the vectoring system is set for diverting the airstream downwardly the moments produced by the fans 22 and 36 are normally equal and opposite.

The turbine engine 24 to the rear of its turbine and ahead of the lift fan 22 is intersected by a longitudinal connecting duct 40 (FIG. 1) which is connected to the turbine engine 38, at a point also between its turbine and the lift fan 36. Likewise, the turbine engines 28 and 34 which power the fans 26 and 32, respectively, are connected in the same manner by another longitudinal connecting duct 42 (FIG. 1). Accordingly, the connecting ducts 40 and 42 form connections between the front turbine engines 24 and 28 and the rear turbine engines 34 and 38.

Thus, the forward fan 26 is interconnected to the aft fan 32, the forward fan 22 is interconnected to the aft fan 36, and the wing fan 10 is connected to the wing fan 14. The foregoing combinations form independent pairs of interconnected fans and engines.

BASIC PROPULSION SYSTEM OPERATION

The turbine engines 12, 16, 24, 28, 34 and 38 and their associated fans 10, 14, 22, 26, 32 and 36 are substantially the same in construction and operation, and accordingly only the fan 10 and its turbine engine 12 will be described in further detail. The turbine engine 12 (FIG. 2) is in effect a turbojet or turbofan engine without a discharge or thrust-creating nozzle. The engine 12 has an inlet 48 at one end through which air is drawn. The major components of the engine 12 are a compressor 52, a combustion chamber 56 and a turbine 54. A rotor shaft 50 which is common to the compressor 52 and turbine 54 passes coaxially through the engine 12. The compressor 52 is located upstream from the turbine 54 and of course compresses air drawn into the inlet 48. The air so compressed enters a combustion chamber 56 located between the compressor 52 and turbine 54 where it is mixed with fuel supplied through a fuel line 57. The air-fuel mixture burns in the combustion chamber 56 and the expanded gases resulting from the combustion pass downstream through the turbine 54 where some of the energy is extracted to turn the rotor shaft 50 and thereby drive the compressor 52. Much energy, however, still remains in the expanded gases and this energy is utilized primarily to power the lift fan 10 located further downstream, although during aircraft control application some of it may also be used to power the lift fan 14.

The expanded gases discharged from the turbine 54 enter the short gas generator attached duct 58 (FIG. 2) having a radial port 60 projecting therefrom, and this port 60 is connected with one end of the connecting duct 18. The opposite end of the duct 18 is, of course, connected to the radial port 60 on the generator attached duct 58 of the other turbine engine 16.

The duct 58 connects to a duct 62 which opens into a pair of ducts 66 and 64 and the ducts 66 and 64 in turn open into a scroll 70 (FIG. 2) forming part of the lift fan 10. The duct 62 is arranged to divide the flow of high energy gases derived from the engine 12 into the two ducts 64 or 66, and these ducts are provided with valves 68 for controlling the pressure level of the gases flowing in ducts 64 and 66. Although the two ducts 64 and 66 have been described it is possible to use only a single larger duct. The valves 68 of course provide means for varying the flow of expanded gases and for throttling the flow when either valve 68 is actuated. Normally, the valves 68 operate in unison, but they may be operated independently of one another as will subsequently be explained in greater detail. The ducts 58, 62, 64 and 66 located between each engine and fan may be collectively designated as a thrust unit duct. The valves 68 may be termed pressure control means.

Figures 2, 3:
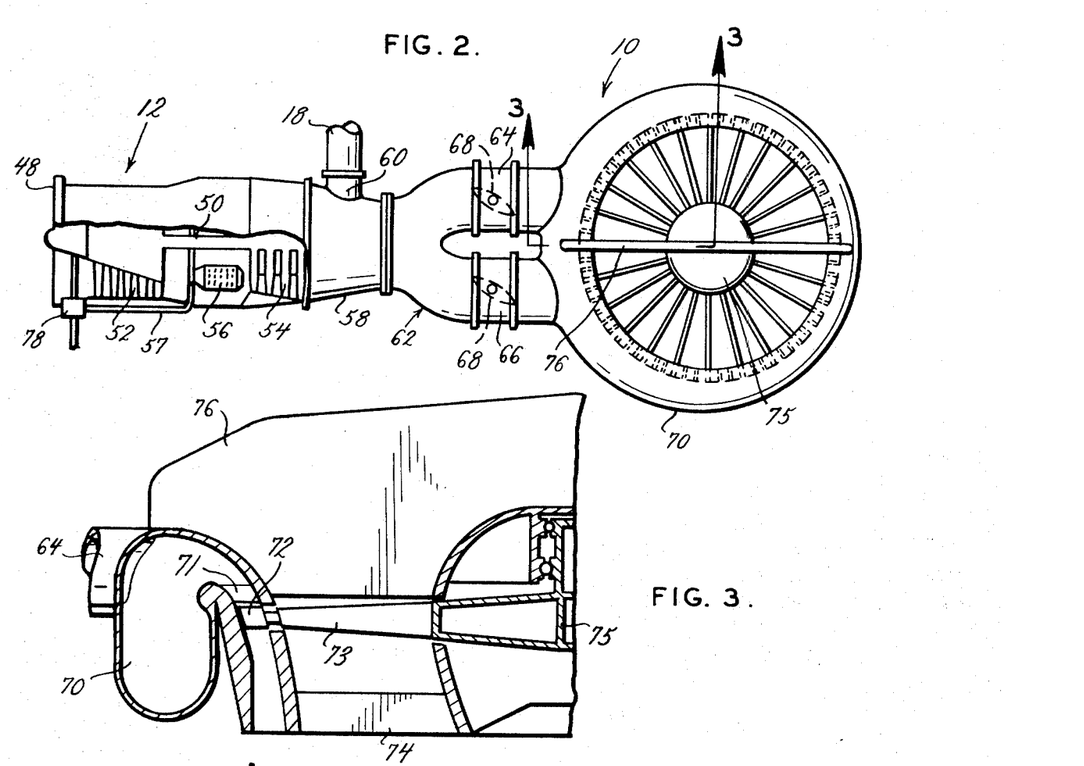
FIG. 2 is a schematic view of a pair of turbine engines, modulating valves, and fans forming the primary parts of the propulsion system.
FIG. 3 is a fragmentary sectional view taken along line 3—3 of FIG. 2.

The lift fan 10 to which the duct 62 is connected is of the so-called turbotip variety, and as the name implies, its fan blade has a turbine integrated into its periphery. More specifically, the lift fan 10 major components include (FIGS. 2 and 3) a scroll 70, turbine nozzle 71, turbine rotor 72, fan rotor 73, and fan stator 74 (FIG. 3). The two ducts 64 and 66 leading away from the duct 62 open into the scroll 70. The center of the housing 70 is the fan air flow path which extends radially inward to the fan hub 75. A suitable structural member 76 supports a fan hub 75. The fan rotor 73 has individual blades which are encircled by the stator 70 and which upon rotation of the fan rotor 73 pump air to create a lift or upwardly directed propulsive thrust on the end of the right wing 6. To provide the power required by the fan to pump the air flow and create the thrust, the turbine 72 is mounted on the tip of the fan rotor 73 and extracts an equivalent power from the high energy gas stream ducted to the fan turbine 72 by the scroll 70. The fan speed and thrust can then respond rapidly to changes in the energy level of the gases introduced into the scroll 70.

Finally, it should be noted that each engine 12, 16, 24, 28, 34 and 38 is provided with a fuel control system 78 such as an isochronous governor for holding the speed of the engine rotor 50 nearly constant at any throttle setting selected by the pilot. For any selected throttle setting it increases the fuel flow through the line 57 should the rotor speed decrease from the speed for that throttle setting and conversely decreases the fuel flow should the rotor speed increase. Fuel control systems of this nature are conventional.

In summary, the engine 12 draws or pumps air in through the inlet 48, compresses it at the compressor 52, mixes the compressed mixture with fuel and burns the mixture in the combustion chamber 56 so that hot gases at relatively high pressure are passed through the turbine 54 and discharged into the duct 58 at substantial velocity. These high energy gases pass through the ducts 62, 64 and 66 and into the scroll 70 of the fan 10, wherein they flow past the turbine blades 72 along the periphery of the fan rotor 73. The turbine blades 72 extract energy from the gases, and as a result the fan rotor 73 rotates and pumps air through the fan hub to fan tip annulus (air flow path). Indeed, the air is discharged from the fan rotor 73 with considerable velocity, thus creating a substantial thrust. The gases expelled from the scroll 70 after passing through the turbine blades 72 on the periphery of the fan rotor 73 are also directed downwardly and hence supplement the thrust created by the rotating fan rotor 73. The engine fuel system adjusts fuel flow as required to maintain nearly constant rpm regardless of the disturbance.

OPERATION

In a normal substantially vertical ascent all the turbine engines 12, 16, 24, 28, 34 and 38 are in operation to provide the gas energy for rotating the fan blades 76 of their respective fans 12, 14, 22, 26, 32 and 36. The vectoring system of the thrust fans 32 and 36 are moreover positioned to divert the normally horizontal air flow from those fans downwardly to create lift. The power level or gas flow through each of the engines 12, 16, 24, 26, 34 and 38 is increased and this of course increases the angular velocity of the fan blade 76 in each fan 10, 14, 22, 24, 32 and 34, acting in concert, will produce enough lift to overcome the gross weight of the aircraft and thereby lift it off of the ground. In a stable ascent the moments created about the center of gravity by the fans 10 and 14 will be equal and opposite, and so will the moments produced by the fans 22 and 36 and by the fans 26 and 32. Moreover, substantially no gas will flow through the connecting ducts 18, 40 and 42 which connect the various pairs of engines.

Should the balance of any of the opposing moments generated by the fans 10 and 14, by the fans 22 and 36 or by the fans 26 and 32 disturbed be disturbed the aircraft 2 will either pitch about its transverse axis or roll about its longitudinal axis, and the roll or pitch can only be controlled by altering or modulating the lift derived from the fans. Indeed, the fan on the low side should produce greater lift, or in other words, the energy supply to that fan should be increased, for if the power to the fan on the high side were cut the net lift would decrease and the aircraft 2 would lose altitude (undesirable height coupling), requiring oversizing of the lift system. Similarly, pilot-initiated maneuvers may be achieved by selectively varying the thrusts of the fans 10 and 14, the fans 22 and 36, and the fans 26 and 32.

Figure 4:
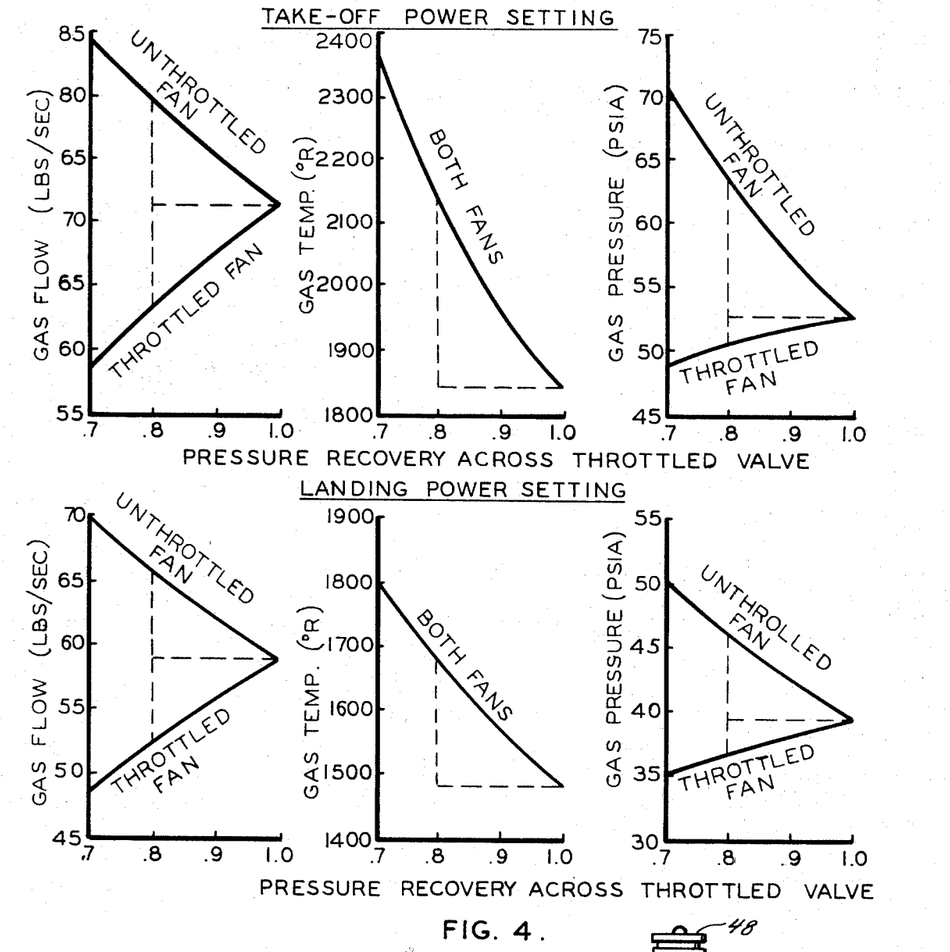
FIG. 4 is a series of graphs showing the effect of the pressure recovery across the throttled valve on the gas energy distribution at the turbines of two interconnected turbotip lift fans.
Figure 5:
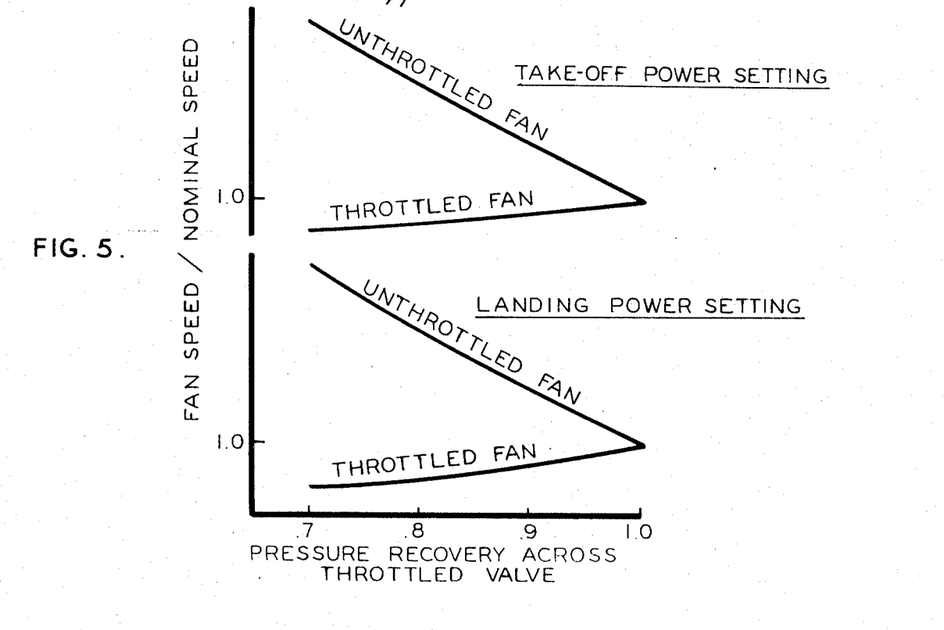
FIG. 5 is a graph showing the fan speed performance as a function of the throttled valve pressure recovery.
Figure 6:
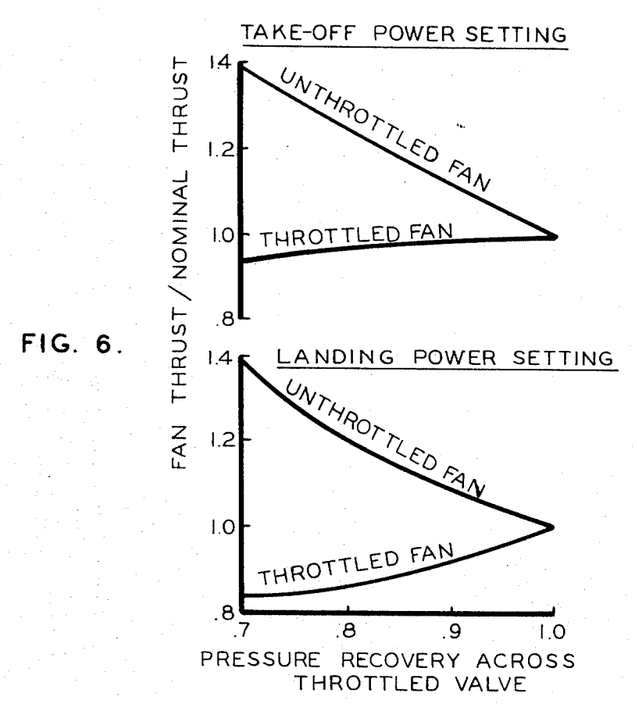
FIG. 6 is a graph showing the fan thrust performance as a function of the throttled valve pressure recovery.

Assuming the balance of moments about the longitudinal axis of the aircraft 2 is disturbed such that the aircraft rolls to the right, the lift from the fan 10 can be increased appreciably to bring the aircraft to a stabilized position, merely by partially closing valves 68 in duct 62 connecting engine 16 and the fan 14 in the left wing 8. Partially closing the valves 68 (depressing pressure recovery across valves 68), in effect, restricts or throttles the flow of high energy gases through the two ducts 64 and 66 leading from the duct 62 so that the gases entering the scroll 70 are at a lesser pressure which also causes a reduction of the mass flow to the scroll 70. The throttling further creates a back pressure within duct 58 and at the final stage of the turbine 54 in the engine 16, thereby forcing the compressor 52 to operate at a higher compression ratio. This back pressure tends to reduce the speed of the rotor 50 in the engine 16 due to the increase in power required by the compressor 52 and the reduced power available from the engine turbine 54 to drive the compressor 52, and were it not for the fuel control system 78 the engine rotor speed would indeed decrease significantly. The fuel control system 78, however, senses the slight decrease in engine rotor speed caused by the back pressure and supplies more fuel through the fuel line 57 to the combustion chamber 56 so as to provide the increased energy to drive the compressor 52 and maintain the rotor speed substantially constant. Consequently, the engine 16 operates at a higher temperature and also discharges gases into the duct 58 at a significantly greater temperature (FIG. 4) and slightly greater pressure as compared to the gases exhausted when the valves 68 are fully open. This increase in temperature and pressure tends to offset the energy loss caused by the throttling at the valves 68 and the accompanying reduction in the mass flow to the fan 14. As a result, the energy transferred to the fan rotor 73 at the scroll 70 remains about the same (FIG. 5). Thus, even when the valves 68 are partially closed, the rpm and lift produced by the fan 14 remains about the same (FIGS. 5 and 6).

The back pressure within the connecting conduit 58 leading from the engine 16 creates a pressure differential between the ducts 58 of the engines 16 and 12. As a result some of the gases discharged from the turbine 54 of the engine 16 flow through the connecting duct 18 and enter the duct 58 at the end of the engine 12, which in turn back pressures that engine. The ducts 64 and 66 leading to the fan 10 are unthrottled since their valves 68 are completely open, and through these ducts 64 and 66 flow all of the gases discharged from the turbine 54 of the engine 12 in addition to those gases which are transferred from the other engine 16 through the connecting duct 18. This increased flow relative to nominal or design flow does not require a larger fan turbine 72 to pass the flow because of the increased density (pressure) of the gases during control application (FIG. 4). Consequently, the quantity or mass flow gas passing through the scroll 70 of the fan 10 is somewhat greater than the quantity or mass flow of gas passing through the scroll 70 of the fan 14 (FIG. 4), and this alone is enough to cause fan 10 to rotate faster (FIG. 5) than fan 14 and produce more lift (FIG. 6).

Closing the valves 68 in duct 62 leading to the fan 14 not only diverts some of the gases discharged from the engine 16 into the connecting duct 18 and thence to the fan 10, but it has the further effect of creating a back pressure within the duct 58 leading from the engine 12. This back pressure has the same effect on the engine 12 as the previously described back pressure has on the engine 16, namely, it has the tendency to reduce the speed of the engine rotor 50. The fuel control system 78 for the engine 16, on the other hand, senses this decrease in rotor speed and supplies more fuel through the line 57 to the combustion chamber 56 so as to maintain the speed of the rotor 50 in that engine substantially constant. For some engines the engine-fuel control system response and resultant change in discharge gas pressure and temperature may require an excessive amount of time and therefore not be capable of meeting the aircraft VTOL control rates. For these engines the desired response characteristics can be attained by signaling the fuel system to increase the fuel flow rate as a function of the valve 68 rotation (angle) or valve pressure loss. The gases discharged from the turbine 54 accordingly are at a significantly elevated temperature and slightly greater pressure as compared to stabilized operating conditions when no gases flow through the connecting duct 18, and these high pressure and high temperature gases are delivered to the scroll 70 of the fan 10. The end result is a substantial increase in energy delivered to the fan 10 (FIG. 4), whereas the energy delivered to the fan 14 remains about the same. Thus, the fan 10 rotates faster and exerts greater thrust (FIGS. 5 and 6).

In summary, when the valves 68 in the duct 62 leading to the fan 14 are partially closed the gas flow through the two ducts 64 and 66 ahead of the fan 14 is throttled and an increase in pressure results in the duct 58 at the end of the engine 16. This increased pressure would normally reduce the speed of the rotor 50 in the engine 16, but the fuel control system 78 prevents that by supplying more fuel to the combustion chamber 56 of the engine 16. The engine 16 accordingly operates at a higher temperature and discharges gases at greater pressure and significantly higher temperature. This increased temperature and pressure compensates for the reduction in flow caused by the throttling at the partially closed valves 68, and the energy extracted from the gases flowing through the scroll 70 of the fan 14 remains about the same. Thus, the speed of the fan blade 76 of the fan 14 does not vary appreciably when the valves 68 are closed and therefore it produces approximately the same lift (FIGS. 5 and 6). The throttling in the duct 62 leading to the fan 14 further diverts some of the gases discharged from the engine 16 into the duct 18 and these diverted gases after leaving the duct 18 flow through the other fan 10, thus increasing the gas flow through that fan. The diverted gases in addition create a back pressure or increased pressure in the duct 58 at the end of the other engine 12, and this back pressure tends to slow down the engine 12, but is prevented from doing so by the fuel control system 78 which supplies more fuel to the combustion chamber 56. Thus, the engine 12 also discharges gases at higher temperature and pressure, and all of the gases so discharged pass unthrottled through the fully open ducts 64 and 66 leading from the engine 12 and into the fan 10. Compared with normal operating conditions, the mass flow of gases into the scroll 70 of the fan 10 is somewhat greater, and the gases so flowing are unthrottled and at a higher energy level (FIG. 4). Consequently, the fan 10 rotates faster and produces greater lift (FIGS. 5 and 6). This, in turn, overcomes the moment generated by the fan 14 and brings the aircraft 2 back to a stabilized position, or it may be used to produce a desired roll.

To generate roll in the opposite direction about the longitudinal axis of the aircraft 2, that is to raise the left wing 8 and bring the right wing 6 downwardly, the valves 68 in ducts 64 and 66 leading to the fan 10 are partially closed, while the valves 68 in ducts 64 and 66 leading to the fan 14 remain fully open.

Since the partial closure of the sets of valves 68 located ahead of either of the fans 10 and 14 has the effect of increasing the overall lift derived from the fans 10 and 14, the aircraft 2 will tend to rise as the valves 68 are operated. In other words, by reason of the fact that the fan associated with the throttle ducts 64 and 66 produces about the same lift, whereas the fan associated with the unthrottled ducts 64 and 66 produces significantly more lift, the net lift produced by both fans 10 and 14 is increased, and this would normally cause the aircraft 2 to rise. While the tendency to rise does not in any way create a safety hazard, it nevertheless may be eliminated by spoiling devices on the fans 10 and 14. The spoiling devices are nothing more than utilization of the vectoring vanes located beneath the fan blades on the rotor 73 for the dual role of spoiling lift as well as vectoring. Spoiling is accomplished by alternate positioning of the vanes fore and aft (high lift loss position) when the appropriate or associated upstream valves 68 are operated. The vectoring vanes are movable so that their positions can be varied in accordance with the positions of the valves 68 and so that they will not affect the airstream when both fans 10 and 14 are operating under a stabilized condition wherein they produce equal lift.

The moments derived from the remaining pairs of fans, that is from the fans 22 and 36, on one hand, and the fans 26 and 32 on the other are varied in the same manner as the moments derived from the wing fans 10 and 14 are varied.

The transition from the vertical ascent to horizontal fixed wing flight is achieved by vectoring all of the fans 10, 14, 22, 26, 32 and 36.

Should one engine of a pair of engines by rendered inoperative, significant lift as well as control may still be derived from both the lift fans associated with those engines by utilizing the remaining engine and by blocking one of the ducts 64 or 66 leading to each of those fans. More specifically, assuming that the engine 16 is inoperative, then the engine 12 may be used to power both the lift fans 10 and 14 to provide lift and control at the ends of the wings 6 and 8. This is achieved by completely closing the valves 68 in the ducts 64 leading to each fan 10 and 14 and keeping the valves 68 in the remaining ducts 66 open. The closure of the ducts 64 maintains the exhaust pressure, temperature, and flow rate of the operative engine 12 at designed levels. The operative engine 12 supplies gases to the scroll 70 of the fan 10 by way of the duct 58 and the duct 66. Approximately, one-half the gas flow derived from the engine 12 passes through the foregoing duct 66 and to the fan 10 so that the fan 10 does not rotate as fast or produce as much lift as it would under normal operating conditions. The other half of the gas flow derived from the engine 12 enters the connecting duct 18 and flows into the duct 58 at the end of the engine 16. Since the duct 64 for the engine 16 is blocked by the valve 68, therein, the gas flows only through the duct 66 to the lift fan 14. The fan rotor 73 of the fan 14 likewise rotates at reduced velocity and does not product the lift it would under normal operating conditions, but both fans 10 and 14 produce nearly equal lift considerable in excess of the 60 percent level. In such an instance control is afforded by manipulating the valves 68 in the ducts 66 as if both engines 12 and 16 were supplying high energy gases.

The concept of the present invention may also be integrated into a turbojet propulsion system 88 (FIG. 7), that is a propulsion system in which the propulsive thrust is derived from high energy gases issuing from thrust nozzles. More specifically, the turbojet system 88 includes a pair of turbine engines 90 and 92 which are very similar to the turbine engine 12, and hence each includes an inlet, a rotor, a compressor, a turbine 54, a combustion chamber, and a fuel control system.

Figure 7:
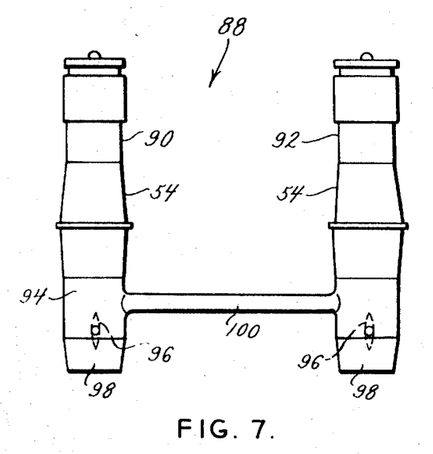
FIG. 7 is a schematic view applying this invention to a propulsion system utilizing thrust nozzles instead of turbotip fans.

The turbine 54 of each engine is connected to a flow duct 94, and the flow ducts 94 in turn contain valves 96 which when operated vary the effective cross-sectional area of the ducts 94. Downstream from its valves 97 each duct 94 discharges into a thrust nozzle 98 which is a typical turbojet nozzle capable of producing thrust when high energy gases issue therefrom. Upstream from their valves 96, the ducts 94 are joined by a connecting duct 100.

The turbojet propulsion system 88 operates in a manner similar to the various pairs of engines and lift fans utilized in the aircraft 2, only the gases discharged from the turbine engines 90 and 92 create a propulsive thrust by passing through the nozzles 98 instead of through the turbine of a turbotip fan. In any event, when either of the valves 96 is partially closed both engines 90 and 92 are partially back pressured and discharge gases at a higher energy level. This results in an increase in thrust from the unthrottled nozzle 98 and about the same thrust from the throttled nozzle 98.

Likewise, the concept of the present invention may be utilized with a so-called turbofan propulsion system 110 (FIG. 8), and that system includes a pair of turbine engines 112 and 114, each of which, like the engine 12, includes an inlet, a rotor, a compressor, a turbine, a combustion chamber and a fuel control system. The rotor is, of course, rotated by the turbine, and at its forward end it further drives a fan 116, the blades of which project radially beyond the engine 112 or 114 and are disposed within a housing 118 which encircles the engine 112 or 114.

Figure 8:
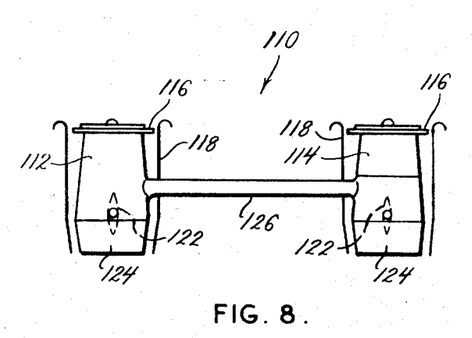
FIG. 8 is a schematic view applying this invention to a turbofan propulsion system.

Each engine 112 and 114 at the end of its turbine connects with a duct 120 containing a valve 122, and the duct 120 in turn is connected to and opens into a nozzle 124 capable of creating a thrust when high energy gases issue from it. The housing 118 also terminates adjacent to the nozzle 124 so that the thrust developed at the nozzle 124 is supplemented by the discharge from the housing 118 of the air flow created by the fan 116. Upstream from their valves 122, the ducts 120 are connected by an additional duct 126.

Figure 9:
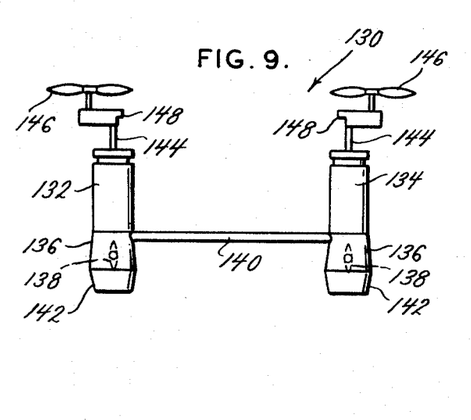
FIG. 9 is a schematic view of still another application of this invention to a turbopropulsion system.

In addition, the concept of the present invention may be incorporated into a turboprop propulsion system 130 (FIG. 9). That propulsion system includes a pair of turbine engines 132 and 134, each having an inlet, a rotor, a compressor, a turbine, a combustion chamber, and a fuel control system, just as does the turbine engine 12. At the end of its turbine each engine 132 and 134 is connected to a duct 136 containing a modulating valve 138, and upstream from these valves 138 the two ducts 136 are interconnected by a connecting duct 140.

Each duct 136 discharges into a turbine 142 having a drive shaft 144 connected to it, and that drive shaft 144 extends coaxially through the turbine engine 132 or 134 preceding it. The drive shaft 144 drives a propeller 146 through a set of reduction gears 148. Thus, the high energy gas issuing from the turbine engines 132 and 134 power the turbines 142 which in turn rotate the props 146.

The propulsion system 130 likewise operates very similar to the propulsion system described in conjunction with the aircraft 2. When one of the modulating valves 138 is partially closed the two turbine engines 132 and 134 are back pressured, and the energy transferred to the turbine 142 located behind the partially closed valve 138 remains about the same while the energy transferred to the turbine located behind the other valve 138 increases significantly. This, of course, causes one prop 146 to rotate faster or permit increased propeller pitch compared with the other propeller and accordingly the propulsive thrusts developed by the props 146 are varied.

Figure 10:
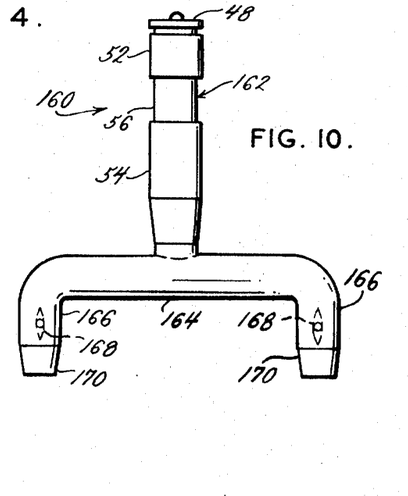
FIG. 10 is a schematic view of an application of this invention in a propulsion system utilizing only one gas generator.

While the propulsion control systems heretofore described utilize thrust units in pairs and corresponding pairs of turbine engines power those thrust units, a single turbine engine or other gas generator may be employed to power two or more thrust units (FIG. 10). In particular, a propulsion system 160 includes a single turbine engine 162 which is very similar to the turbine engine 12 and includes an inlet, a rotor, a compressor, a turbine, a combustion chamber, and a fuel control system. The turbine engine 162, downstream from its turbine, discharges into the midportion of a connecting duct 164, and the connecting duct 164 in turn merges into a pair of ducts 166 at its ends. Each duct 166 contains a modulating valve 168, and downstream from that valve 168 it is connected to a thrust unit 170 which may be a nozzle as illustrated, a turbotip fan, the turbine of a turboprop system, or the like.

In operation the turbine engine 162 discharges high energy gases into the connecting duct 164 which in turn diverts those gases to the two ducts 166 and the thrust units 170 located at the end of the those ducts 166. When the valves 168 are in their fully open positions each thrust unit 170 develops the same thrust, assuming of course that the thrust units 170 and the ducts 166 are the same size. Should it be desired to modulate the thrust, that is to say to increase the thrust from one unit 170 over that of the other unit 170, one of the modulating valves 168 is partially closed, while the other is left fully open. This back pressures the system, or more specifically creates a slight increase in pressure in the two ducts 166 and in the connecting duct 164 since all three are connected together. Consequently, the turbine engine 162 will tend to slow down, but the fuel control system will introduce more fuel into the engine combustion chamber to maintain engine speed. As a result, the engine 162 will discharge the gases at a higher energy level. More of this higher energy gas will be diverted to the unthrottled thrust unit 170, that is the one behind the fully open valve 168, and consequently that thrust unit 170 will develop a thrust greater than the throttled thrust unit 170 behind the partially closed valve 168. The thrust developed by the throttled unit 168 will remain about the same, that is it will be approximately the same magnitude as it was before the valve 168 preceding it was partially closed.

This invention is intended to cover all changes and modifications of the example of the invention herein chosen for purposes of the disclosure which do not constitute departures from the spirit and scope of the invention.

What is claimed is:

1. A propulsion and control system comprising gas generator means capable of producing high energy gases; ducting connected to the gas generator means for receiving high energy gases therefrom; at least two thrust units connected with the ducting for converting the high energy gases from the ducting into propulsive thrusts; separate pressure control means associated with each thrust unit, each pressure control means being normally in an open condition wherein a minimum restriction of the flow to the thrust unit with which it is associated exists, each pressure control means being operable independently of the other pressure control means to restrict, but not block, the flow of high energy gases to the associated thrust unit and to effect a back pressure in that portion of the ducting located upstream from the two pressure control means and downstream from the gas generator; and means associated with the gas generator means for causing it to deliver gases at an even higher energy level when either one of the pressure control means is operated to create a back pressure in the ducting, whereby the thrust unit associated with the pressure control means which is not operated will deliver greater thrust than the thrust unit associated with the operated pressure control means which will still continue to deliver thrust.

2. The structure according to claim 1 wherein the gas generating means comprises at least two gas generators connected to the ducting upstream from the pressure control means; and wherein the discharge portions of the two gas generators are in communication through the ducting so that when one of the pressure control means is operated, the back pressure at both gas generators is increased.

3. The structure according to claim 1 wherein the pressure control means are in the portions of the ducting leading to the thrust units and throttle the high energy gases passing through the ducting when they are operated.

4. The structure according to claim 12 wherein the gas generating means is a turbine engine comprising a compressor for compressing air, a combustion chamber located downstream from the compressor for burning a fuel with the compressed air, and a turbine located downstream from the combustion chamber for receiving gases derived from the combustion chamber, the turbine and compressor including a common rotor.

5. The structure according to claim 1 wherein the ducting includes a thrust unit duct connected to each thrust unit and a connecting duct interconnecting the thrust unit ducts; wherein the gas generating means includes a turbine engine is connected to each thrust unit duct upstream from the connecting duct; and wherein the pressure control means are located in the thrust unit ducts downstream from the connecting duct.

6. The structure according to claim 5 wherein each thrust unit duct includes at least two flow channels; wherein the pressure control means includes valves in each channel; and wherein one of the two valves of each thrust unit duct may be moved to a completely closed position in which it completely blocks its channel while the other valve may be independently moved from an open position to positions in which it further restricts the channel in which it is disposed, whereby both thrust units may be utilized with gases supplied from only one gas generating means.

7. A propulsion system according to claim 1 wherein each thrust unit comprises a free-wheeling fan rotor provided with turbine blades at its periphery, and a scroll connected with the ducting for directing gases discharged therefrom across the turbine blades on the fan rotor.

8. A propulsion and control system comprising: at least one gas generator capable of converting fuel into high energy gases and having a rotor, the speed of which is affected by the back pressure of the high energy gases with the speed tending to fall off as the back pressure increases, and a fuel control system which is responsive to the rotor speed and tends to keep the rotor speed constant by regulating the flow of fuel to the gas generator; ducting for receiving the high energy gases discharged by the gas generator and including at least two modulating sections and a cross connecting section interconnecting the two modulating sections so that the two modulating sections are in communication, the ducting being connected to the gas generator upstream from the modulating sections such that the gas generator discharges into the ducting as an undivided flow; a thrust unit connected to each modulating section of the ducting for converting the high energy gases from the ducting into propulsive thrusts; a pressure controller in each modulating section for increasing the back pressure of the high energy gases in the cross connecting section of the ducting and at the discharge end of the gas generator when operated, the pressure controllers being operable independently of each other, whereby when one pressure controller is operated, the back pressure at the gas generator will increase and the rotor speed will tend to fall off, where-upon the fuel control system will sense the decrease in speed and deliver more fuel to the gas generator so that it will exhaust gases into the ducting at an even higher energy level, thus enabling both thrust units to deliver thrust with the thrust unit downstream from the pressure controller which is not operated delivering the greater thrust.

9. A propulsion and control system according to claim 8 wherein at least two gas generators are provided with one being connected to the ducting immediately upstream from the one modulating duct and the other being connected to the ducting immediately upstream from the other modulating duct; and wherein the cross connecting section communicates with the modulating section downstream from the gas generators and upstream from the pressure controllers.

10. A method of controlling and varying the thrust exerted by a pair of thrust units connected to ducting into which high energy gases are discharged by gas generating means to which fuel is supplied, said method comprising: restricting, but not blocking, the flow of high energy gases flowing into one of the thrust units so as to increase back pressure in the ducting upstream from both of the thrust units and at the discharge end of the gas generating means; and supplying more fuel to the gas generating means substantially contemporaneously with the onset of the restricting of flow so that the gas generating means discharges gases at an even higher energy level, whereby the thrust unit receiving the unrestricted flow of high energy gases will develop greater thrust than the unit receiving the restricted flow of gases.

11. A method according to claim 10 wherein the gas generating means includes two gas generators which discharge into the ducting at different locations with the one being located closer to one of the thrust units and the other being located closer to the other thrust unit; and further characterized by passing all of the gases discharged from the gas generator located close to the thrust unit which receives the unrestricted flow through that thrust unit, and passing some of the gases from the generator located close to the thrust unit which receives the restricted flow through the thrust unit which receives the unrestricted flow also.

* * * * *